US009584831B2

(12) United States Patent
Yang

(10) Patent No.: US 9,584,831 B2
(45) Date of Patent: Feb. 28, 2017

(54) IMAGE FRAME TRANSMISSION METHOD, MOBILE TERMINAL, AND SMART TELEVISION

(71) Applicant: HUIZHOU TCL MOBILE COMMUNICATION CO. LTD., HuiZhou, Guangdong (CN)

(72) Inventor: Tianfa Yang, HuiZhou (CN)

(73) Assignee: HUIZHOU TCL MOBILE COMMUNICATION CO., LTD., Huizhou, Guangdong (CN)

( * ) Notice: Subject to any disclaimer, the term of this patent is extended or adjusted under 35 U.S.C. 154(b) by 211 days.

(21) Appl. No.: 14/410,443

(22) PCT Filed: Aug. 12, 2013

(86) PCT No.: PCT/CN2013/081282
§ 371 (c)(1),
(2) Date: Dec. 22, 2014

(87) PCT Pub. No.: WO2014/139261
PCT Pub. Date: Sep. 18, 2014

(65) Prior Publication Data
US 2016/0057456 A1  Feb. 25, 2016

(30) Foreign Application Priority Data
Mar. 15, 2013  (CN) .......................... 2013 1 0083103

(51) Int. Cl.
*H04N 11/02* (2006.01)
*H04N 19/63* (2014.01)
(Continued)

(52) U.S. Cl.
CPC .......... *H04N 19/63* (2014.11); *G06F 3/1454* (2013.01); *G06T 1/60* (2013.01); *G09G 5/005* (2013.01);
(Continued)

(58) Field of Classification Search
USPC ........................................ 375/240.01–240.29
See application file for complete search history.

(56) References Cited

U.S. PATENT DOCUMENTS 5,541,659 A * 7/1996 Kojima .................... H04N 7/54
375/240.11
5,546,477 A * 8/1996 Knowles ................. G06F 17/14
375/E7.03
(Continued)

FOREIGN PATENT DOCUMENTS

CN       101106719 A    1/2008
CN       101867809 A    10/2010
(Continued)

OTHER PUBLICATIONS

International Search report of PCT/CN2013/081282 dated Dec. 12, 2013.
(Continued)

*Primary Examiner* — Leron Beck
(74) *Attorney, Agent, or Firm* — Hauptman Ham, LLP

(57) ABSTRACT

Data compression is performed on an original image frame of a display buffer area of the mobile terminal by using a wavelet transform compression algorithm, and after the compressed data is transmitted to the smart television and an inverse wavelet transform decompression processing is performed thereon, the original image frame is restored for display, so as to achieve the content display between the screens of the mobile terminal and the smart television. Existing hardware is used to compress and decompress data, which does not occupy operation resources of the mobile terminal and the smart television, and improves the system performance and accelerates the data compression speed. Also, the adopted wavelet transform compression algorithm can effectively improve the data compression ratio, reduce (Continued)

the data transmission amount in the transmission process, and reduce the hardware overhead.

5 Claims, 3 Drawing Sheets

(51) Int. Cl.
H04N 21/41 (2011.01)
H04N 21/4363 (2011.01)
H04N 21/4402 (2011.01)
H04N 19/635 (2014.01)
G06F 3/14 (2006.01)
G06T 1/60 (2006.01)
G09G 5/00 (2006.01)

(52) U.S. Cl.
CPC ....... *H04N 19/635* (2014.11); *H04N 21/4126* (2013.01); *H04N 21/43637* (2013.01); *H04N 21/4402* (2013.01); *H04N 21/440263* (2013.01); *G09G 2340/02* (2013.01); *G09G 2360/18* (2013.01)

(56) References Cited

U.S. PATENT DOCUMENTS

| 5,661,822 | A | * | 8/1997 | Knowles | G06F 17/14 375/E7.03 |
| 5,838,377 | A | * | 11/1998 | Greene | H04N 19/63 375/240.11 |
| 5,984,514 | A | * | 11/1999 | Greene | G06F 17/148 375/E7.045 |
| 6,236,757 | B1 | * | 5/2001 | Zeng | H04N 19/147 375/E7.042 |
| 7,930,434 | B2 | | 4/2011 | Arcas et al. | |
| 9,386,318 | B2 | * | 7/2016 | Ridenour | H04N 19/115 |
| 2006/0038705 | A1 | * | 2/2006 | Brady | G06T 9/00 341/123 |
| 2006/0215751 | A1 | * | 9/2006 | Reichel | H04N 19/10 375/240.03 |
| 2007/0150617 | A1 | | 6/2007 | Hariki et al. | |
| 2007/0165959 | A1 | * | 7/2007 | Takada | H04N 19/63 382/240 |
| 2009/0219404 | A1 | * | 9/2009 | Kobayashi | H04N 19/619 348/222.1 |
| 2009/0324116 | A1 | * | 12/2009 | Takada | G06T 9/007 382/246 |
| 2010/0053352 | A1 | * | 3/2010 | Dekel | H04N 5/335 348/222.1 |
| 2010/0245672 | A1 | | 9/2010 | Erdler et al. | |
| 2011/0193999 | A1 | * | 8/2011 | Gilg | H04N 19/63 348/262 |
| 2013/0077886 | A1 | | 3/2013 | Kondo | |

FOREIGN PATENT DOCUMENTS

| CN | 102710986 A | 10/2012 |
| CN | 102948150 A | 2/2013 |
| CN | 103152573 A | 6/2013 |
| EP | 1864222 A2 | 12/2007 |

OTHER PUBLICATIONS

Song Yanxing, Study on Some Key Technologies of High-speed Image Acquisition Processihng System, Dissertation, Apr. 15, 2011, pp. 26-34 and pp. 62-63, Apr. 2011, China Doctoral Dissertations Full-text Database in China National Knowledge Infrastructure, Beijing China.

* cited by examiner

IMAGE FRAME TRANSMISSION METHOD, MOBILE TERMINAL, AND SMART TELEVISION

CROSS REFERENCE TO RELATED APPLICATION

This application claims the priority of International Application No. PCT/CN2013/081282, filed on Aug. 12, 2013, which claims priority to Chinese Application No. 201310083103.4, filed on Mar. 15, 2013. The entire disclosures of each of the above applications are incorporated herein by reference.

TECHNICAL FIELD OF THE INVENTION

The present invention relates to a multi-screen interaction technology, and more particularly, to an image frame transmission method, a mobile terminal, and a smart television.

BACKGROUND OF THE INVENTION

Nowadays, mobile terminals and smart televisions have become products commonly used by people. However, the display screen of the mobile terminal is small and the display scope thereof is relatively limited. Also, the user's experience is not very good when certain application programs are being used. Therefore, people gradually need communication and interconnection between smart mobile terminals and smart televisions, or even data and screen sharing therebetween.

Such a multi-screen interaction technology with regard to communication and interconnection between the smart mobile terminal and the smart television is to proceed transmitting, analyzing, presenting, and controlling multimedia content between different communication devices via a wireless network, so as to achieve transmitting the display data on the mobile terminal to the smart television and displaying the same thereon, and satisfy the user's needs.

In conventional skills, various smart mobile terminals (e.g., smart phones and tablets) mainly adopt operating systems such as Google Android, Microsoft WP8 (Windows Phone 8), Apple iOS (iPhone OS), and Nokia Symbian operating systems. When content is displayed by using the operating system, the content required by the device for display is stored into a display buffer area of the operating system. Then, a display driver of the mobile terminal is responsible for transmitting the content stored in the display buffer area to a display screen to be displayed thereon. Due to the performance limitations of a processor of the mobile terminal, the content display between multiple screens dramatically increases the amount of calculations of the processor, and the amount of data transmitted from the mobile terminal to the smart television is quite large as well, thereby affecting the display effect.

SUMMARY OF THE INVENTION

Considering the above drawbacks existing in the conventional skills, the present invention provides an image frame transmission method, a mobile terminal, and a smart television for solving the problems and drawbacks existing in the conventional skills.

The technical schemes adopted to solve the technical problems in the present invention are described below.

An image frame transmission method comprises steps of performing row operations on an original image frame in a display buffer area of a first communication device by adopting the Haar wavelet function to obtain first row matrices and meanwhile performing column operations on the original image frame by adopting the Haar wavelet function to obtain first column matrices; performing transformations on the first row matrices and the first column matrices by adopting the Mallat algorithm to obtain a first transformed matrix; compressing the first transformed matrix by the first communication device and then transmitting the compressed first transformed matrix to a second communication device; decompressing the compressed first transformed matrix by the second communication device to obtain a second transformed matrix; performing row operations on the second transformed matrix by adopting an inverse wavelet transform function to obtain second row matrices and performing column operations on the second transformed matrix by adopting the inverse wavelet transform function to obtain second column matrices; and performing transformations on the second row matrices and the second column matrices by adopting the Mallat algorithm to obtain a to-be-played image frame and transmitting the to-be-played image frame to a display buffer area of the second communication device.

A mobile terminal comprises a first display module, an image encoding compression module, and a first network communication module. The image encoding compression module is respectively connected to the first display module and the first network communication module. The first network communication module being connected to a corresponding smart television. The first display module is utilized for transmitting an original image frame to the image encoding compression module. The image encoding compression module is utilized for performing row operations on the original image frame in a display buffer area of the mobile terminal by adopting the Haar wavelet function to obtain first row matrices and meanwhile performing column operations on the original image frame by adopting the Haar wavelet function to obtain first column matrices, performing transformations on the first row matrices and the first column matrices by adopting the Mallat algorithm to obtain a first transformed matrix, and compressing the first transformed matrix and then transmitting the compressed first transformed matrix to the first network communication module. The first network communication module is utilized for transmitting the compressed first transformed matrix to the smart television.

A smart television comprises a second display module, an image encoding decompression module, and a second network communication module. The image encoding decompression module is respectively connected to the second display module and the second network communication module. The second network communication module is connected to a corresponding mobile terminal. The second network communication module is utilized for receiving a compressed first transformed matrix from the mobile terminal and transmitting the compressed first transformed matrix to the image encoding decompression module. The image encoding decompression module is utilized for decompressing the compressed first transformed matrix to obtain a second transformed matrix, performing row operations on the second transformed matrix by adopting an inverse wavelet transform function to obtain second row matrices and performing column operations on the second transformed matrix by adopting the inverse wavelet transform function to obtain second column matrices, performing transformations on the second row matrices and the second column matrices by adopting the Mallat algorithm to obtain a to-be-played image frame, and transmitting the to-be-played image frame to the second display module. The second display module is utilized for displaying the to-be-played image frame on the smart television.

In contrast to the conventional skills, the present invention adopts a wavelet transform compression algorithm to compress image display data of the mobile terminal and then transmits that to the smart television. Based on an inverse wavelet transform algorithm, the smart television decompresses the compressed data, and after that, the image display data of the mobile terminal is restored. The system can use the existing hardware to compress and decompress data, which does not occupy operation resources of the mobile terminal and the smart television, and can improve the system performance and accelerate the data compression speed. Also, adopting the wavelet transform compression algorithm can effectively improve the data compression ratio, reduce the data transmission amount in the transmission process, and reduce the hardware overhead.

DETAILED DESCRIPTION OF THE INVENTION

Figure 1:
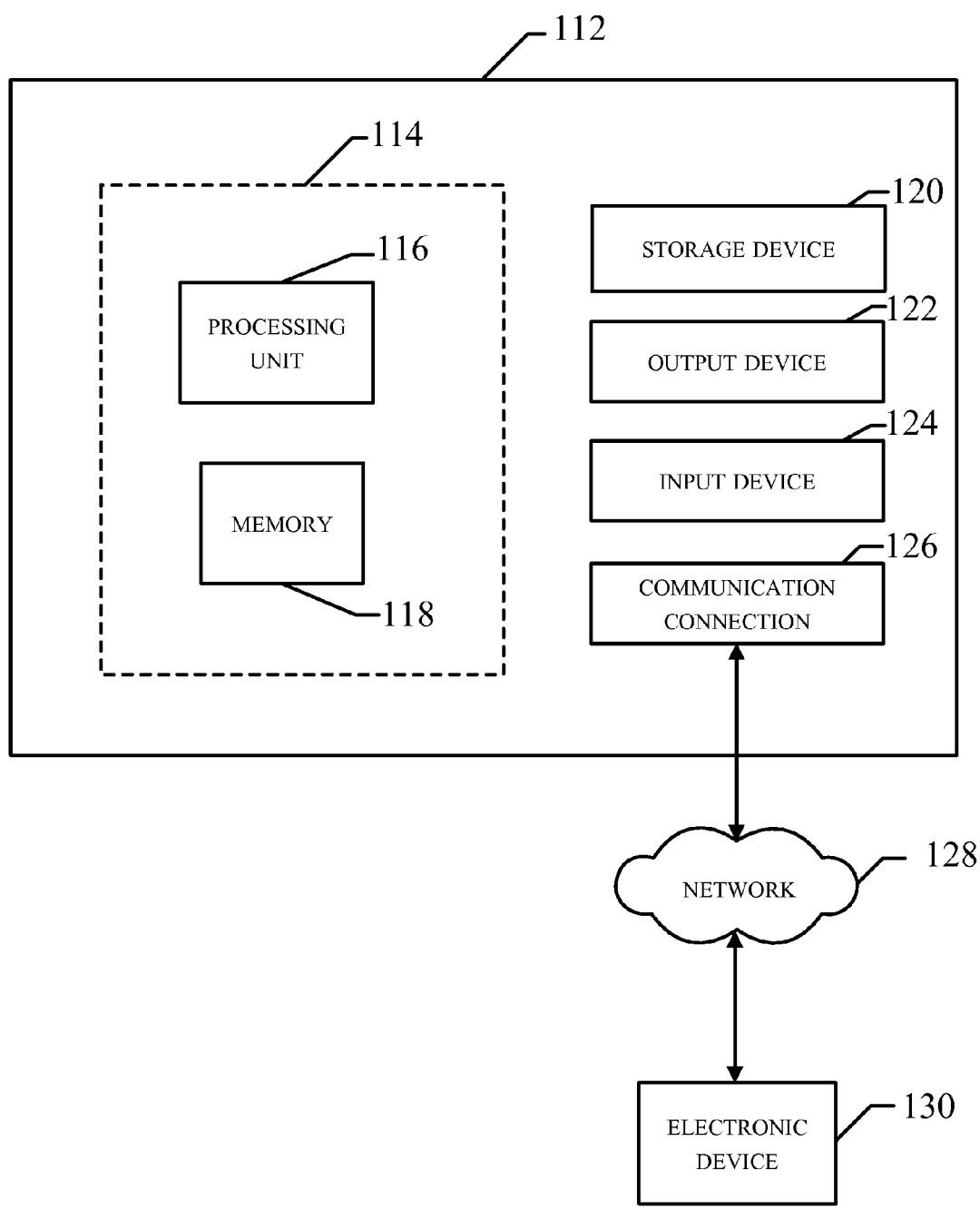
FIG. 1 is a schematic structural diagram showing a working environment of a communication device of the present invention.

Please refer to the drawings, in which the same components are represented by the same component symbols. The principle of the present invention is illustrated by an application in a suitable computing environment. The following description is based on the illustrated specific embodiment of the present invention, which should not be construed as limiting other specific embodiments not discussed in detail herein.

In the following description, the specific embodiments of the present invention with reference to steps and symbols of operations performed by one or more computers will be described, unless otherwise stated. Therefore, it will be understood that these steps and operations are performed by a computer, which will be mentioned for several times later, the computer including a computer processing unit manipulating electronic signals which are representative of a structured type of data. This manipulation converts the data or maintains the location of the data in a memory system of the computer, which can be reconfigured, or otherwise a person skilled in this art changes the way of operation of the computer in a well-known manner. The data structure maintained in the physical location of the data in the memory has specific properties defined by the data format. However, the principle of the present invention described in the above text does not lead to a limitation. A person skilled in the art will understand that the various steps and operations described below may also be implemented in hardware.

As used herein, the terms "component", "module", "system", "interface", and so on are generally intended to refer to computer-related entities, for example, software, software in execution, or a combination of hardware, or hardware and software. For example, a component may be a process running on a processor, a processor, an object, an executable application program, a thread in execution, a program, and/or a computer but is not limited thereto. As illustrated in the drawings, a component can be both of an application running on a controller and the controller. One or more components may be in an executed process and/or thread and the components may be localized on one computer and/or distributed between two or more computers.

Furthermore, the claimed subject matter may be the disclosed theme method, apparatus, or article of manufacture implemented by using standard programming and/or engineering techniques to produce software, firmware, hardware, or any combination thereof to control a computer. As used herein, the term "manufacture" is intended to encompass any of the computer-readable devices, carriers, or computer programs accessed by media. Of course, a person skilled in the art will recognize that many modifications may be made to this configuration without departing from the spirit or scope of the claimed subject matter.

FIG. 1 and the ensuing discussion provide a general and brief description of a work environment of a communication device implementing the present invention. The working environment shown in FIG. 1 is just one example of a suitable working environment but is not intended to suggest any limitation on the scope of use or functionality of the work environment. Examples of the communication device 112 may include, but are not limited to, personal computers, server computers, hand-held or laptop devices, mobile devices (e.g., mobile phones, personal digital assistants (PDAs), media players, etc.), multiprocessor systems, consumer electronics, minicomputers, mainframe computers, distributed computing environments that include any of the above systems or devices, and the like.

Although not requested, embodiments are described under a universal background that "computer readable instructions" are executed by one or more electronic devices. The computer readable instructions may be distributed via a computer-readable medium (discussed below). The computer readable instructions may be implemented as program modules such as objects, Application Programming Interfaces (APIs), and data structures that perform particular tasks or implement particular abstract data types. Typically, the functions of computer-readable instructions can be combined or distributed in various environments arbitrarily.

FIG. 1 illustrates an example of the communication device 112 in one or more instances of the image frame transmission method of the present invention. In one configuration, the communication device 112 includes at least one processing unit 116 and memory 118. Depending on the exact configuration and type of electronic device, the memory 118 may be volatile (such as RAM), non-volatile (such as ROM, flash memory, etc.), or some combination thereof. This configuration is illustrated in FIG. 1 by a dashed line 114.

In other embodiments, the communication device 112 may include additional features and/or functionality. For example, the communication device 112 may also include additional storage apparatuses (e.g., removable and/or non-removable), which includes, but is not limited to, magnetic storage devices, optical storage devices, and the like. Such additional storage apparatuses are illustrated by a storage device 120 in FIG. 1. In one embodiment, the computer readable instructions carrying out one or more embodiments provided herein may be stored in the storage device 120. The storage device 120 may also store other computer readable instructions used to implement the operating system and application programs. The computer readable instructions may be loaded into memory 118 and executed by the processing unit 116, for example.

As used herein, the term "computer readable medium" includes a computer storage media. The computer storage media includes volatile and nonvolatile, removable and non-removable media implemented by any approach or technique for storing information such as computer readable instructions and other data. The memory 118 and the storage device 120 are examples of computer storage media. Computer storage media includes, but is not limited to, RAM, ROM, EEPROM, flash memory or other memory technology, CD-ROM, digital versatile disks (DVD) or other optical storage devices, magnetic cassettes, magnetic tapes, magnetic disk storage devices or other magnetic storage devices, or any other medium able to store desired information and be accessed by the communication device 112. Any such computer storage media may be a part of the communication device 112.

The communication device 112 may further be allowed to establish a communication connection 126 to communicate with other apparatuses. The communication connection 126 may include, but is not limited to, a modem, a network interface card (NIC), an integrated network interface, a radio frequency transmitter/receiver, an infrared port, or USB connection, or other interfaces used to connect the communication device 112 to other electronic apparatuses. The communication connection 126 may include a wired connection or a wireless connection. The communication connection 126 may transmit and/or receive communication media.

The term "computer readable medium" may include the communication media. The communication media typically embodies computer readable instructions or other data included in "modulated data signals" carried by, for example, a carrier wave or other transport mechanism, and includes information delivery media. The term "modulated data signals" may include signals that one or more signal characteristics are set or changed according to the way the information is encoded into signals.

The communication device 112 may include an input device 124, such as a keyboard, a computer mouse, a digital pen, a voice input device, a touch input device, an infrared cameras, a video input device, and/or any other input device. The communication device 112 may also include an output device 122, such as one or more displays, speakers, printers, and/or any other output device. The input device 124 and the output device 122 may be connected to the communication device 112 via a wired connection, a wireless connection, or any combination thereof. In one embodiment, the input device or output device from other electronic devices can be used as the input device 124 or the output device 122 of the communication device 112.

Components of the communication device 112 may be connected to each other via various interconnections (such as bus). Such interconnections may include Peripheral Component Interconnect (PCI) (e.g., Fast PCI), Universal Serial Bus (USB), FireWire (IEEE 1394), optical bus structure, etc. In another embodiment, the components of the communication device 112 may be interconnected via a network. For example, the memory 118 may be composed of a plurality of physical storage units at different physical locations, which are interconnected via the network.

A person skilled in the art will recognize that the storage devices for storing computer-readable instructions may be distributed across the network. For example, the electronic device 130 accessible via the network 128 may store the computer-readable instructions carrying out one or more embodiments provided in the present invention. The communication device 112 may access the electronic device 130 and download a part of or all of the computer readable instructions for execution. Alternatively, the communication device 112 can download plural computer-readable instructions as desired, or some instructions are executed on the electronic device 130 while some are executed on the communication device 112.

The present disclosure provides various operations for the embodiments. In one embodiment, one or more operations may constitute one or more computer-readable instructions stored in the computer-readable storage medium, which cause the computing device to perform the operations when be executed on the communication device. Some or all of the described sequence of operations should not be construed to imply that these operations are necessary to be dependent on the order. A person skilled in the art will appreciate that alternative orders may also have the advantages described in this specification. Moreover, it should be understood that not all of the operations must be presented in each of the embodiments provided herein.

Moreover, the word "preferred" used herein means serving as an embodiment, an illustration, or an example. As described herein, the term "preferred" is not necessary to be construed as any aspect or design superior to the other aspects or designs. Instead, the word exemplary manner is designed to specific concepts. In this application, the term "or" refers to an inclusive "or" rather than an exclusive "or." That is, unless specified otherwise, or clear from the context, "X using A or B" means any natural aimed inclusive replacement. That is, if X employs A; X employs B; or X employs both A and B, then "X using A or B" is satisfied by any of the aforementioned circumstances.

Furthermore, despite relative to one or more implementations shown and described in the present disclosure, the equivalent variations and modifications based on the present specification and drawings will occur to those skilled in the art upon reading and understanding. The present disclosure includes all such modifications and variations, and is only limited by the scope of the appending claims. Especially with regard to various functions performed by the above-described components (e.g., elements, resources, etc.), the terms used to describe such components are intended to indicate any component (unless otherwise indicated) corresponding to a specified function (for example, that is functionally equivalent) performed by the described components, even though not structurally equivalent to the disclosed structure carrying out the functions in the exemplary implementations of the present disclosure described in the content text. In addition, although a particular feature of the present disclosure may have been disclosed with respect to one of several embodiments, this feature can be combined with one or more other features in the other embodiments which are expected or advantageous to any given or particular application. Moreover, the terms "including", "having", "with", or variants thereof used in the detailed description or the claims are intended to be used in a manner similar to the term "comprising".

The image frame transmission method of the present invention is a scheme provided for transmitting screen images between a mobile terminal (i.e., a first communication device) and a smart television (i.e., a second communication device).

When the mobile terminal displays any content on a display screen, the operating system copies to a display buffer area the content desired to be displayed and a display driver of the mobile terminal is responsible for displaying on the display screen the content stored in the display buffer area. The image display for the smart television having an operating system is based on the same principle. The mobile terminal of the present invention includes a smart terminal piece having an operating system, for example, a smart phone, a tablet, and a Personal Digital Assistant (PDA), but is not limited thereto. The working environment of the mobile terminal and the smart television of the present invention can be illustrated by the communication device 112 shown in FIG. 1.

Figure 2:
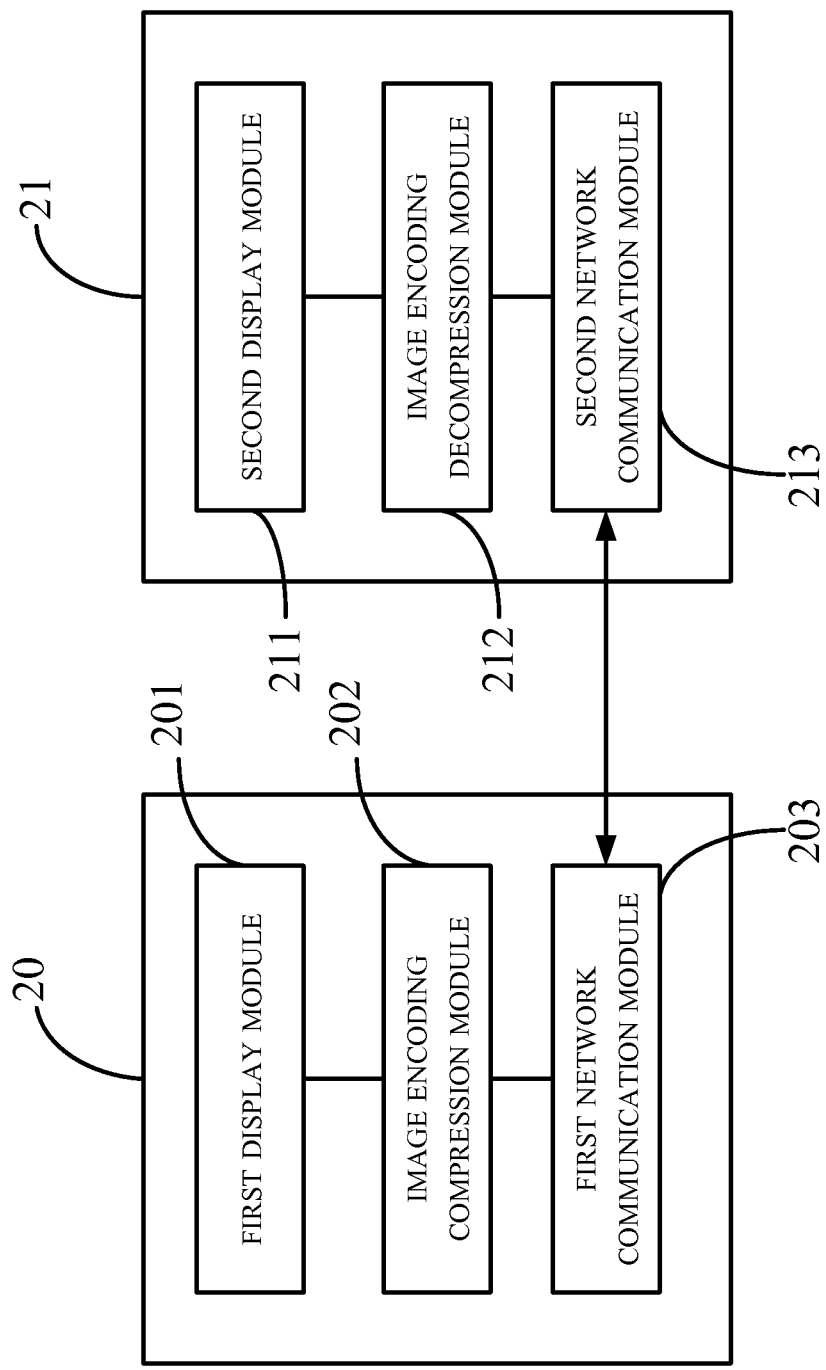
FIG. 2 is a schematic structural diagram showing a mobile terminal and a smart television in accordance with a preferred embodiment of the present invention.

Please refer to FIG. 2, which is a schematic structural diagram showing a mobile terminal and a smart television in accordance with a preferred embodiment of the present invention. The mobile terminal 20 of the present preferred embodiment comprises a first display module 201, an image encoding compression module 202, and a first network communication module 203. The smart television 21 comprises a second display module 211, an image encoding decompression module 212, and a second network communication module 213. The image encoding compression module 202 of the mobile terminal 20 is respectively connected to the first display module 201 and the first network communication module 203. The image encoding decompression module 212 of the smart television 21 is respectively connected to the second display module 211 and the second network communication module 213. The first network communication module 203 communicates with the second network communication module 213.

The first display module 201 of the mobile terminal 20 is utilized for transmitting an original image frame of the mobile terminal 20 to the image encoding compression module 202.

The image encoding compression module 202 of the mobile terminal 20 is utilized for adopting the Haar wavelet function to perform row operations and column operations on the original image frame in a display buffer area of the mobile terminal 202 to obtain first row matrices and first column matrices of the original image frame respectively, adopting the Mallat algorithm to perform transformations on the first row matrices and the first column matrices to obtain a first transformed matrix, and compressing the first transformed matrix and then transmitting the compressed first transformed matrix to the first network communication module 203.

The first network communication module 203 of the mobile terminal 20 is utilized for transmitting the compressed data (i.e., the compressed first transformed matrix) of the first transformed matrix to the second network communication module 213.

The second network communication module 213 of the smart television 21 is utilized for receiving the compressed data of the first transformed matrix transmitted by the first network communication module 203 and transmitting it to the image encoding decompression module 212.

The image encoding decompression module 212 of the smart television 21 is utilized for decompressing the compressed data of the first transformed matrix to obtain a second transformed matrix, then adopting an inverse wavelet transform function to perform row operations and column operations on the second transformed matrix to obtain second row matrices and second column matrices respectively, adopting the Mallat algorithm to perform transformations on the second row matrices and the second column matrices to obtain a to-be-played image frame, and transmitting the to-be-played image frame to the second display module 211.

The second display module 211 of the smart television 21 is utilized for displaying the aforesaid to-be-played image frame on the smart television.

The specific working principles of the mobile terminal and the smart television of the present preferred embodiment may refer to the description of an embodiment of the image frame transmission method introduced below.

Pertaining to the mobile terminal and the smart television, CPU performance of such an embedded system is not very powerful. The CPU may be overloaded if it is adopted to perform compression. In the present invention, the compression and decompression can be carried out by FPGA and does not occupy CPU operation resources, thereby improving the system performance and accelerating the data compression speed.

Figure 3:
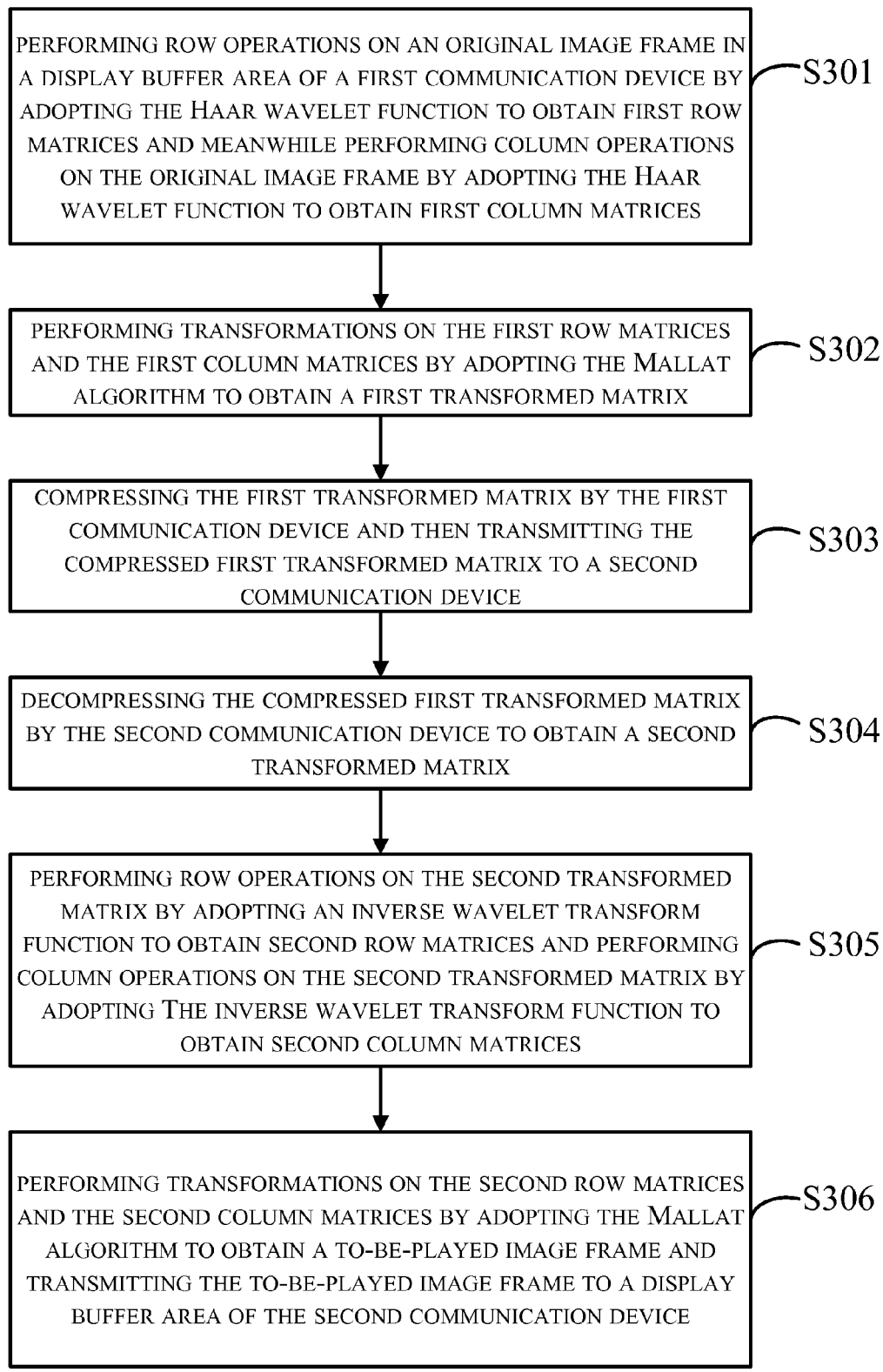
FIG. 3 is a flow chart of an image frame transmission method in accordance with a preferred embodiment of the present invention.

Please refer to FIG. 2 and FIG. 3. FIG. 3 is a flow chart of an image frame transmission method in accordance with a preferred embodiment of the present invention. The image frame transmission method of the present preferred embodiment includes the following steps.

In Step S301, the Haar wavelet function is adopted to perform row operations on an original image frame in a display buffer area of a first communication device (e.g., a mobile terminal) to obtain first row matrices and meanwhile perform column operations on the original image frame to obtain first column matrices.

Specifically, the Haar wavelet function adopted by the image encoding compression modeul 202 is $$H(n) = \begin{pmatrix} 1 & 1 & \ldots & 1 & 1 \\ 0 & 0 & \ldots & 0 & 0 \\ \ldots & \ldots & \ldots & \ldots & \ldots \\ 1 & 1 & \ldots & 1 & 1 \\ 0 & 0 & \ldots & 0 & 0 \end{pmatrix} \times \frac{1}{\sqrt{2}},$$

where n represents a matrix of order n. Specifically, adopting the Haar wavelet function H(n) to perform the row operations on the original image frame is $$\begin{bmatrix} yR_{k,0} \\ yR_{k,1} \\ \ldots \\ yR_{k,n} \end{bmatrix} = H(n) \times \begin{bmatrix} X_{k,0} \\ X_{k,1} \\ \ldots \\ X_{k,n} \end{bmatrix},$$

where $X_{k,0}, X_{k,1}, \ldots, X_{k,n}$ represents a row matrix of the $k^{th}$ column of the original image frame and $yR_{k,0}, yR_{k,1}, \ldots, yR_{k,n}$ represents the first row matrices obtained after the row operations are performed. Specifically, adopting the Haar wavelet function H(n) to perform the column operations on the original image frame is $$\begin{bmatrix} yC_{k,0} \\ yC_{k,1} \\ \ldots \\ yC_{k,n} \end{bmatrix} = H(n) \times \begin{bmatrix} XC_{k,0} \\ XC_{k,1} \\ \ldots \\ XC_{k,n} \end{bmatrix},$$

where $XC_{k,0}, XC_{k,1}, \ldots XC_{k,n}$ represents a column matrix of the $k^{th}$ row of the original image frame and $yC_{k,0}, yC_{k,1}, \ldots, yC_{k,n}$ represents the first column matrices obtained after the column operations are performed.

In Step S302, the Mallat algorithm is adopted to perform transformations on the first row matrices and the first column matrices to obtain a first transformed matrix.

Specifically, adopting the Mallat algorithm by the image encoding compression module 202 to perform transformations on the first row matrices and the first column matrices to obtain the first transformed matrix is $G = yR_{k,i} + yC_{k,i}$, where i=0 . . . n, and G is the first transformed matrix obtained after the wavelet transformation.

In Step S303, the first communication device is utilized to compress the first transformed matrix and then transmit the compressed first transformed matrix to a second communication device (e.g., a smart television).

The first network communication module 203 of the mobile terminal 20 compresses the data of the first transformed matrix and then transmits the compressed first transformed matrix to the second network communication module 213 of the smart television 21. Specifically, the communication between the mobile terminal 20 and the smart television 21 is carried out by a wired network or a wireless network. Data transmission through a network connection is well-known in the art, and is not described in detail herein. Specifically, compressing the first transformed matrix by utilizing the image encoding compression module 202 is carried out by obtaining a $$\frac{n}{2} \times \frac{n}{2}$$

submatrix at the upper left corner of the first transformed matrix. Since the $$\frac{n}{2} \times \frac{n}{2}$$

submatrix at the upper left corner of the first transformed matrix obtained after the wavelet transformation includes more than 98% information of the first transformed matrix, the image encoding compression module 202 can proceed restoring in the subsequent processes as long as this submatrix is obtained. Meanwhile, the compression ratio is improved. In such a manner, the amount of data transmitted to the smart television 21 is only a quarter of the original matrix. Of course, the wavelet transformation may be further made to two-step transformation and three-step transformation. The data amount after the two-step transformation is only 1/16 of the data amount of the original matrix. The data amount after the three-step transformation is only 1/32 of the data amount of the original matrix. It should be noted that the more the transformation steps in compression, the more distortion and compression ratio. Also, the number of the transformation steps should be restricted within reasonable bounds according to circumstances.

In Step S304, the second communication device is utilized to decompress the compressed first transformed matrix to obtain a second transformed matrix.

After the second network communication module 213 of the smart television 21 receives the compressed first transformed matrix from the first network communication module 203 of the mobile terminal 20, the image encoding decompression module 212 decompresses the compressed first transformed matrix to obtain the second transformed matrix. The second network communication module 213 of the smart television 21 receives the compressed first transformed matrix (i.e., the $$\frac{n}{2} \times \frac{n}{2}$$

submatrix at the upper left corner of the first transformed matrix) from the mobile terminal 20, and then the image encoding decompression module 212 expands the $$\frac{n}{2} \times \frac{n}{2}$$

submatrix into an n×n matrix, i.e., the second transformed matrix.

In Step S305, an inverse wavelet transform function is adopted to perform row operations on the second transformed matrix to obtain second row matrices and perform column operations on the second transformed matrix to obtain second column matrices.

Specifically, the inverse wavelet transform function adopted by the image encoding decompression module 212 of the smart television 21 is $$V(n) = \begin{pmatrix} 1 & 0 & \ldots & -1 & 0 \\ 1 & 0 & \ldots & 1 & 1 \\ \ldots & \ldots & \ldots & \ldots & \ldots \\ 0 & 1 & \ldots & 0 & 1 \\ 0 & 1 & \ldots & 1 & -1 \end{pmatrix} \times \frac{1}{\sqrt{2}},$$

where n represents a matrix of order n.

Specifically, performing the row operations on the second transformed matrix is $$\begin{bmatrix} y'R'_{k,0} \\ y'R'_{k,1} \\ \ldots \\ y'R'_{k,n} \end{bmatrix} = V(n) \times \begin{bmatrix} X'_{k,0} \\ X'_{k,1} \\ \ldots \\ X'_{k,n} \end{bmatrix},$$

where $X'_{k,0}, X'_{k,1}, \ldots, X'_{k,n}$ represents a row matrix of the $k^{th}$ column of the second transformed matrix and $y'R'_{k,0}, y'R'_{k,1}, \ldots, y'R'_{k,n}$ represents the second row matrices obtained after the row operations are performed. Specifically, adopting the inverse wavelet transform function to perform the column operations on the second transformed matrix is $$\begin{bmatrix} y'C'_{k,0} \\ y'C'_{k,1} \\ \ldots \\ y'C'_{k,n} \end{bmatrix} = V(n) \times \begin{bmatrix} X'C'_{k,0} \\ X'C'_{k,1} \\ \ldots \\ X'C'_{k,n} \end{bmatrix},$$

where $X'C'_{k,0}, X'C'_{k,1}, \ldots, X'C'_{k,n}$ represents a column matrix of the $k^{th}$ row of the second transformed matrix and $y'C'_{k,0}, y'C'_{k,1}, \ldots, y'C'_{k,n}$ represents the second column matrices obtained after the column operations are performed.

In Step S306, the Mallat algorithm is adopted to perform transformations on the second row matrices and the second column matrices to obtain a to-be-played image frame and the to-be-played image frame is transmitted to a display buffer area of the second communication device.

Specifically, a matrix corresponding the to-be-played image frame obtained after the transformations performed by the image encoding decompression module 212 on the second row matrices and the second column matrices by adopting the Mallat algorithm is carried out by O=y'R'$_{k,i}$+y'C'$_{k,i}$, where i=0 . . . n, and O is the matrix corresponding to the to-be-played image frame obtained after the inverse wavelet transformation. The matrix O is transmitted to a display buffer area of the smart television 21, and a display driver of the smart television 21 drives to display screen images. In such a manner, transmitting the image frame data from the mobile terminal 20 to the smart television 21 and then displaying that on the smart television 21 are carried out.

The image frame transmission method of the present preferred embodiment is terminated at Step S306.

The present invention adopts a wavelet transform compression algorithm to compress image display data of the mobile terminal and then transmits that to the smart television. Based on an inverse wavelet transform algorithm, the smart television decompresses the compressed data, and after that, the image display data of the mobile terminal is restored. The system can use the existing hardware to compress and decompress data, which does not occupy operation resources of the mobile terminal and the smart television, and can improve the system performance and accelerate the data compression speed. Also, adopting the wavelet transform compression algorithm can effectively improve the data compression ratio, reduce the data transmission amount in the transmission process, and reduce the hardware overhead.

It should be understood that the above descriptions are merely for illustrating preferred embodiments of the present invention, and are not sufficient to limit the technical schemes of the present invention. A person of ordinary skill in this field can always make modifications, replacements, alterations, or improvements based on the above descriptions within the spirit and principle of the present invention. All of these modifications, replacements, alterations, or improvements are within the scope as defined in the appended claims of the present invention.

What is claimed is:

1. An image frame transmission method, comprising steps of:

performing row operations on an original image frame in a display buffer area of a first communication device by adopting a Haar wavelet function to obtain first row matrices and meanwhile performing column operations on the original image frame by adopting the Haar wavelet function to obtain first column matrices, wherein the Haar wavelet function is:

$$H(n) = \begin{pmatrix} 1 & 1 & \ldots & 1 & 1 \\ 0 & 0 & \ldots & 0 & 0 \\ \ldots & \ldots & \ldots & \ldots & \ldots \\ 1 & 1 & \ldots & 1 & 1 \\ 0 & 0 & \ldots & 0 & 0 \end{pmatrix} \times \frac{1}{\sqrt{2}},$$

where n represents a matrix of order n, wherein the step of performing the row operations on the original image frame in the display buffer area of the first communication device by adopting the Haar wavelet function to obtain the first row matrices comprises:

$$\begin{bmatrix} yR_{k,0} \\ yR_{k,1} \\ \ldots \\ yR_{k,n} \end{bmatrix} = H(n) \times \begin{bmatrix} X_{k,0} \\ X_{k,1} \\ \ldots \\ X_{k,n} \end{bmatrix},$$

where $X_{k,0}, X_{k,1}, \ldots, X_{k,n}$ represents a row matrix of the $k^{th}$ column of the original image frame and $yR_{k,0}, yR_{k,1}, \ldots, yR_{k,n}$ represents the first row matrices obtained after the row operations are performed, and wherein the step of performing the column operations on the original image frame by adopting the Haar wavelet function to obtain the first column matrices comprises:

$$\begin{bmatrix} yC_{k,0} \\ yC_{k,1} \\ \ldots \\ yC_{k,n} \end{bmatrix} = H(n) \times \begin{bmatrix} XC_{k,0} \\ XC_{k,1} \\ \ldots \\ XC_{k,n} \end{bmatrix},$$

where $XC_{k,0}, XC_{k,1}, \ldots, XC_{k,n}$ represents a column matrix of the $k^{th}$ row of the original image frame and $yC_{k,0}, yC_{k,1}, \ldots, yC_{k,n}$ represents the first column matrices obtained after the column operations are performed;

performing transformations on the first row matrices and the first column matrices by adopting the Mallat algorithm to obtain a first transformed matrix, wherein the step of performing transformations on the first row matrices and the first column matrices by adopting the Mallat algorithm to obtain the first transformed matrix comprises:

G=yR$_{k,i}$+yC$_{k,i}$, where i=0. . . n, and G is the first transformed matrix;

compressing the first transformed matrix by the first communication device and then transmitting the compressed first transformed matrix to a second communication device, wherein the step of compressing the first transformed matrix comprises:

obtaining a $$\frac{n}{2} \times \frac{n}{2}$$

submatrix at the upper left corner of the first transformed matrix and serving that as the compressed first transformed matrix;

decompressing the compressed first transformed matrix by the second communication device to obtain a second transformed matrix;

performing row operations on the second transformed matrix by adopting an inverse wavelet transform function to obtain second row matrices and performing column operations on the second transformed matrix by adopting the inverse wavelet transform function to obtain second column matrices, wherein the inverse wavelet transform function is:

$$V(n) = \begin{pmatrix} 1 & 0 & \ldots & -1 & 0 \\ 1 & 0 & \ldots & 1 & 1 \\ \ldots & \ldots & \ldots & \ldots & \ldots \\ 0 & 1 & \ldots & 0 & 1 \\ 0 & 1 & \ldots & 1 & -1 \end{pmatrix} \times \frac{1}{\sqrt{2}},$$

where n represents a matrix of order n, wherein the step of performing the row operations on the second transformed matrix by adopting the inverse wavelet transform function to obtain the second row matrices comprises:

$$\begin{bmatrix} y'R'_{k,0} \\ y'R'_{k,1} \\ \ldots \\ y'R'_{k,n} \end{bmatrix} = V(n) \times \begin{bmatrix} X'_{k,0} \\ X'_{k,1} \\ \ldots \\ X'_{k,n} \end{bmatrix},$$

where $X'_{k,0}, X'_{k,1}, \ldots, X'_{k,n}$ represents a row matrix of the $k^{th}$ column of the second transformed matrix and $y'R'_{k,0}, y'R'_{k,1}, \ldots, y'R'_{k,n}$ represents the second row matrices obtained after the row operations are performed, and wherein the step of performing the column operations on the second transformed matrix by adopting the inverse wavelet transform function to obtain the second column matrices comprises:

$$\begin{bmatrix} y'C'_{k,0} \\ y'C'_{k,1} \\ \ldots \\ y'C'_{k,n} \end{bmatrix} = V(n) \times \begin{bmatrix} X'C'_{k,0} \\ X'C'_{k,1} \\ \ldots \\ X'C'_{k,n} \end{bmatrix},$$

where $X'C'_{k,0}, X'C'_{k,1}, \ldots, X'C'_{k,n}$ represents a column matrix of the $k^{th}$ row of the second transformed matrix and $y'C'_{k,0}, y'C'_{k,1}, \ldots, y'C'_{k,n}$ represents the second column matrices obtained after the column operations are performed; and performing transformations on the second row matrices and the second column matrices by adopting the Mallat algorithm to obtain a to-be-played image frame and transmitting the to-be-played image frame to a display buffer area of the second communication device, wherein the step of performing transformations on the second row matrices and the second column matrices by adopting the Mallat algorithm to obtain the to-be-played image frame comprises:

$O = y'R'_{k,i} + y'C'_{k,i}$, where i=0 . . . n, and O is a matrix corresponding to the to-be-played image frame.

2. A mobile terminal, comprising:

a display module for transmitting an original image frame;

an image encoding compression module connected to the display module, for receiving the original image frame from the display module, performing row operations on the original image frame by adopting a Haar wavelet function to obtain row matrices and meanwhile performing column operations on the original image frame by adopting the Haar wavelet function to obtain column matrices, performing transformations on the row matrices and the column matrices by adopting the Mallat algorithm to obtain a transformed matrix, and compressing the transformed matrix and then transmitting the compressed transformed matrix; and a network communication module connected to the image encoding compression, for receiving the compressed transformed matrix from the image encoding compression module and transmitting the compressed transformed matrix to an external display device, wherein the Haar wavelet function is:

$$H(n) = \begin{pmatrix} 1 & 1 & \ldots & 1 & 1 \\ 0 & 0 & \ldots & 0 & 0 \\ \ldots & \ldots & \ldots & \ldots & \ldots \\ 1 & 1 & \ldots & 1 & 1 \\ 0 & 0 & \ldots & 0 & 0 \end{pmatrix} \times \frac{1}{\sqrt{2}},$$

where n represents a matrix of order n, wherein the row operations performed on the original image frame by adopting the Haar wavelet function are represented by:

$$\begin{bmatrix} yR_{k,0} \\ yR_{k,1} \\ \ldots \\ yR_{k,n} \end{bmatrix} = H(n) \times \begin{bmatrix} X_{k,0} \\ X_{k,1} \\ \ldots \\ X_{k,n} \end{bmatrix},$$

where $X_{k,0}, X_{k,1}, \ldots, X_{k,n}$ represents a row matrix of the $k^{th}$ column of the original image frame and $yR_{k,0}, yR_{k,1}, \ldots, yR_{k,n}$ represents the row matrices obtained after the row operations are performed, wherein the column operations performed on the original image frame by adopting the Haar wavelet function are represented by:

$$\begin{bmatrix} yC_{k,0} \\ yC_{k,1} \\ \ldots \\ yC_{k,n} \end{bmatrix} = H(n) \times \begin{bmatrix} XC_{k,0} \\ XC_{k,1} \\ \ldots \\ XC_{k,n} \end{bmatrix},$$

where $XC_{k,0}, XC_{k,1}, \ldots, XC_{k,n}$ represents a column matrix of the $k^{th}$ row of the original image frame and $yC_{k,0}, yC_{k,1}, \ldots, yC_{k,n}$ represents the column matrices obtained after the column operations are performed, and wherein the transformations performed on the row matrices and the column matrices by adopting the Mallat algorithm are represented by:

$G = yR_{k,i} + yC_{k,i}$, where i=0 . . . n, and G is the transformed matrix.

3. The mobile terminal according to claim 2, wherein the compression made to the transformed matrix is to obtain a $$\frac{n}{2} \times \frac{n}{2}$$

submatrix at the upper left corner of the first transformed matrix and serve that as the compressed transformed matrix.

4. The mobile terminal according to claim 2, wherein the mobile terminal comprises a smart phone, a tablet, and a Personal Digital Assistant (PDA).

5. A smart television, comprising:
a network communication module connected to an external display device, for receiving a compressed first transformed matrix from the external display device;
an image encoding decompression module connected to the network communication module, for receiving the compressed first transformed matrix from the network communication module, decompressing the compressed first transformed matrix to obtain a second transformed matrix, performing row operations on the second transformed matrix by adopting an inverse wavelet transform function to obtain row matrices and performing column operations on the second transformed matrix by adopting the inverse wavelet transform function to obtain column matrices, performing transformations on the row matrices and the column matrices by adopting the Mallat algorithm to obtain a to-be-played image frame, and transmitting the to-be-played image frame; and
a display module connected to the image encoding depression module, for receiving the to-be-played image frame from the image encoding decompression module and displaying the same on the smart television,
wherein the inverse wavelet transform function is:

$$V(n) = \begin{pmatrix} 1 & 0 & \ldots & -1 & 0 \\ 1 & 0 & \ldots & 1 & 1 \\ \ldots & \ldots & \ldots & \ldots & \ldots \\ 0 & 1 & \ldots & 0 & 1 \\ 0 & 1 & \ldots & 1 & -1 \end{pmatrix} \times \frac{1}{\sqrt{2}},$$

where n represents a matrix of order n wherein the row operations performed on the second transformed matrix by adopting the inverse wavelet transform function are represented by:

$$\begin{bmatrix} y'R'_{k,0} \\ y'R'_{k,1} \\ \ldots \\ y'R'_{k,n} \end{bmatrix} = V(n) \times \begin{bmatrix} X'_{k,0} \\ X'_{k,1} \\ \ldots \\ X'_{k,n} \end{bmatrix},$$

where $X'_{k,0}, X'_{k,1}, \ldots, X'_{k,n}$ represents a row matrix of the $k^{th}$ column of the second transformed matrix and $y'R'_{k,0}, y'R'_{k,1}, \ldots, y'R'_{k,n}$ represents the row matrices obtained after the row operations are performed, wherein the column operations performed on the second transformed matrix by adopting the inverse wavelet transform function are represented by:

$$\begin{bmatrix} y'C'_{k,0} \\ y'C'_{k,1} \\ \ldots \\ y'C'_{k,n} \end{bmatrix} = V(n) \times \begin{bmatrix} X'C'_{k,0} \\ X'C'_{k,1} \\ \ldots \\ X'C'_{k,n} \end{bmatrix},$$

where $X'C'_{k,0}, X'C'_{k,1}, \ldots, X'C'_{k,n}$ represents a column matrix of the $k^{th}$ row of the second transformed matrix and $y'C'_{k,0}, y'C'_{k,1}, \ldots, y'C'_{k,n}$ represents the column matrices obtained after the column operations are performed, and wherein the transformations performed on the row matrices and the column matrices by adopting the Mallat algorithm are represented by:
$O = y'R'_{k,i} + y'C'_{k,i}$, where $i=0 \ldots n$, and O is a matrix corresponding to the to-be-played image frame.

* * * * *